C. T. COE.
LUBRICATING DEVICE.
APPLICATION FILED JUNE 23, 1919.
1,419,821.
Patented June 13, 1922.
3 SHEETS—SHEET 1.
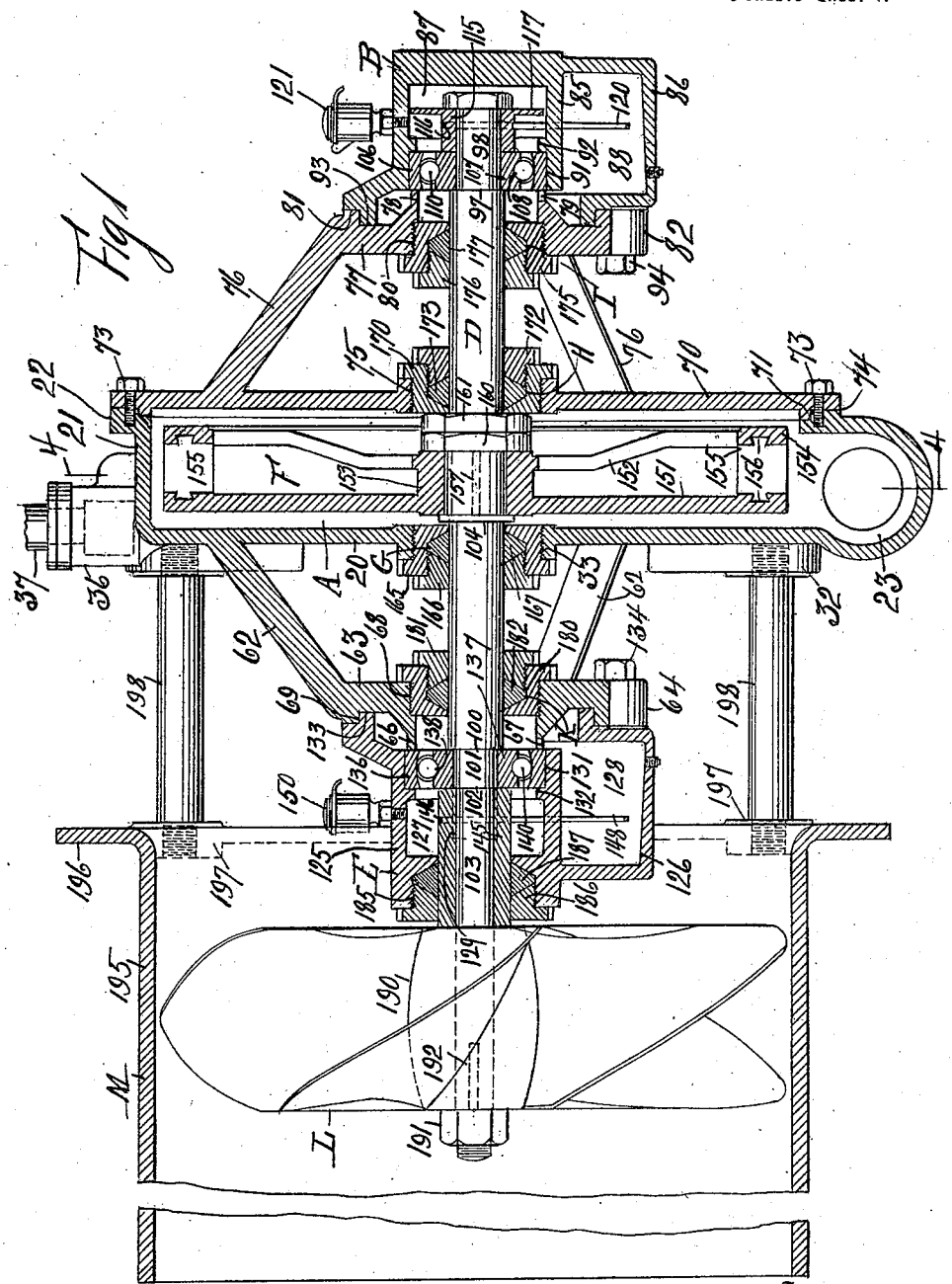
Inventor
Charles T. Coe
By his Attorney
A. H. de Bonneville

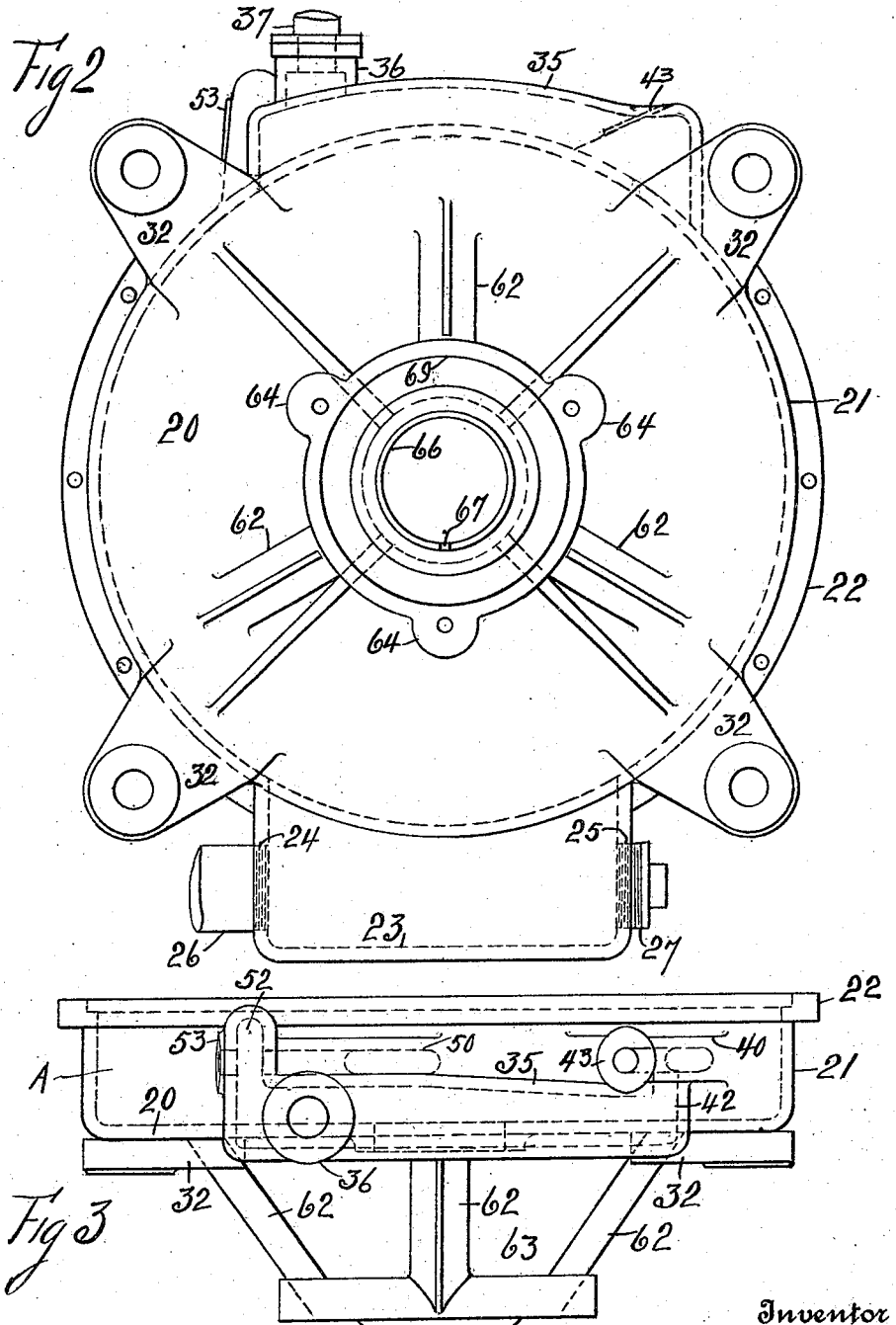

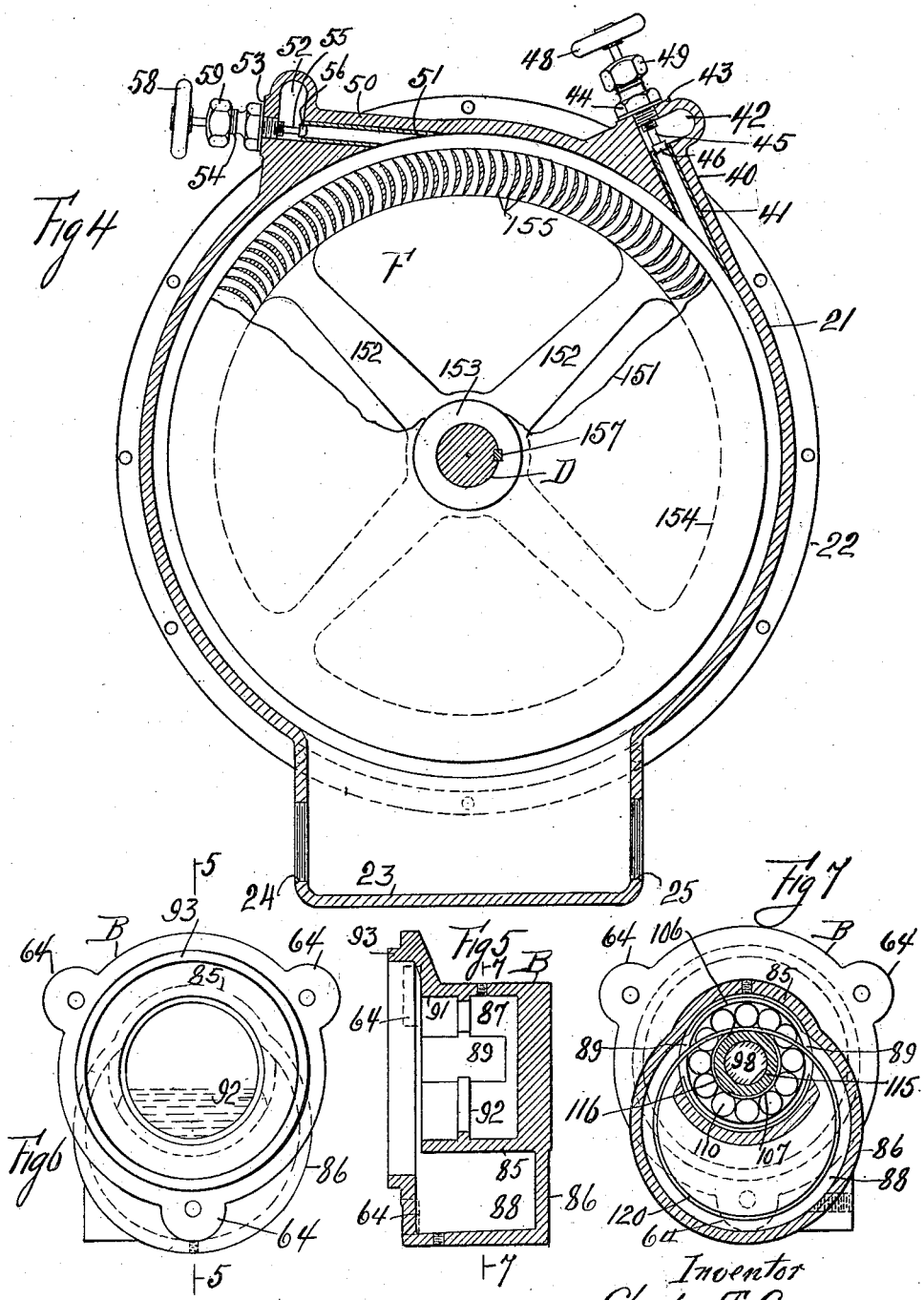

UNITED STATES PATENT OFFICE.

CHARLES T. COE, OF KEARNY, NEW JERSEY.

LUBRICATING DEVICE.

1,419,821.

Specification of Letters Patent. Patented June 13, 1922.

Application filed June 23, 1919. Serial No. 306,068.

*To all whom it may concern:*

Be it known that I, CHARLES T. COE, a citizen of the United States, and a resident of Kearny, in the county of Hudson and State of New Jersey, have invented certain new and useful Improvements in a Lubricating Device, of which the following is a specification.

This invention relates to a lubricating device which is specially applicable to the shaft of a turbine and in the present exemplification is shown with a turbine and fan blower.

In the accompanying drawings, Fig. 1 represents a partial axial vertical section of the lubricating device with a section of a turbine and a fan casing with some of their coacting elements in full, Fig. 2 shows an elevation of the rear of the casing of the turbine; Fig. 3 is a top plan view of Fig. 2; Fig. 4 shows a section of Fig. 1 on the line 4, 4; Fig. 5 shows a vertical sectional view of the turbine end cap as on the line 5, 5 of Fig. 6; Fig. 6 is a left hand end view of Fig. 5 and Fig. 7 represents a section of Fig. 5 on the line 7, 7 with some of its coacting elements indicated in full.

The turbine illustrated comprises the cup-shaped housing indicated in its entirety by the letter A, and comprises the rear wall 20, circumferential side wall 21 with the flange 22. An exhaust chamber 23 having the threaded openings 24 and 25 in its ends is formed with the side wall 21 at its lower portion. An exhaust pipe 26 leads from the opening 24 and a screw plug 27 is in threaded engagement with the opening 25. Lugs 32 with threaded openings are formed with and extend from the rear wall 20 of the casing A, and a threaded stuffing box sleeve 33 is formed with said wall 20. At the crown or upper portion of the circumferential side wall 21 is formed a steam or driving fluid manifold chamber 35 with the inlet barrel 36, for the steam or driving fluid inlet pipe 37. An inlet nozzle 40 with the inlet sleeve 41 is formed at the upper end of the wall 21. A nozzle chamber 42 connects the interior of the sleeve 41 with the interior of the manifold chamber 35. A threaded opening in the upper wall 43 of the chamber 42 has in threaded engagement the valve casing or bonnet 44. A valve spindle 45 is supported in threaded engagement in the bonnet 44 and at one end has fastened thereto the valve 46 and at the other end the operating wheel 48. A stuffing box nut 49 is in threaded engagement with the bonnet 44.

A second inlet nozzle 50 with the sleeve 51 is formed with the upper end of the wall 21. A nozzle chamber 52 connects the interior of the sleeve 51 with the interior of the manifold 35. A threaded opening in the outer wall 53 of the chamber 52 has in threaded engagement the valve casing or bonnet 54. A valve spindle 55 is supported in threaded engagement in the bonnet 54 and at one end has fastened thereto the valve 56 and at the other end the operating wheel 58. A stuffing box nut 59 is in threaded engagement with the bonnet 54.

Triangular shaped supporting arms 62 are formed with and extend from the wall 20. A disc shaped stuffing box support 63 is formed with the ends of the arms 62 and has formed therewith the lugs 64. The support 63 has also formed therewith the sleeve 66 having the opening or port 67 in the lower portion thereof. The support 63 is threaded at 68 and is shouldered at 69.

A cover or bonnet 70 having the shouldered flange 71 is bolted to the flange 22 of the casing A by means of the bolts 73 and the joint 74 between the bonnet 70 and the flange 22 is machined to eliminate the use of any sheet packing. A threaded stuffing box sleeve 75 is formed with the bonnet 70. Triangular shaped supporting arms 76 are formed with and extend from the bonnet 70. A disc shaped stuffing box support 77 is formed with the ends of the arms 76. The support 77 has formed therewith the sleeve 78 having the opening or port 79 at the lower portion thereof. The support 77 is threaded at 80 and has formed therewith the annular shouldered portion 81. Lugs 82 are formed with the support 77. A turbine end cap is indicated in its entirety by the letter B and comprises the barrel 85 which connects with the barrel 86. The interior of the barrel 85 constitutes the journal chamber 87 and the interior of the barrel 86 forms the oil reservoir 88 for the turbine cap B. Openings or ports 89 connect the chamber 87 with the oil reservoir 88. The chamber 87 is counterbored at 91 and has formed therein the annular flange 92. The cap B has formed therewith the annular shouldered portion 93, which is fastened to the shouldered portion 80 by means of the screws or bolts 94.

The turbine shaft is indicated in its entirety by the letter D and is shouldered at 97 for the reduced portion 98. It is also shouldered at 100 for the reduced portion 101 and at 102 for the reduced portion 103. An annular collar or flange 104 is also formed with the shaft D.

The outer race 106 of a ball bearing cage is in frictional engagement with the counter bore 91 of the cap B, so that it will make about one turn every two minutes when the shaft D is turning at about the rate of two thousand revolutions per minute. The inner race 107 of the ball bearing cage is tightly secured to the reduced portion 98 of the shaft D and has formed on its outer circumferential surface the annular groove 108 for the ball bearings 110. A lubricant collecting and distributing ring carrier 115 has formed therewith the circumferential groove 116 on its outer surface and the flange 117 at one end thereof. It is tightly secured to the reduced portion 98 of the shaft D within the barrel 85.

A lubricant collecting and distributing ring 120 bears on the carrier 115 in the groove 116 and extends from the chamber 87 to the oil reservoir 88 through the openings or ports 89. An oil and vent cup 121 of the usual construction is supported on the barrel 85 and feeds oil or other lubricant to the chamber 87.

A fan end cap E similar to the turbine end cap B, comprises the barrel 125 which connects with the barrel 126. The interior of the barrel 125 constitutes the journal chamber 127 and the interior of the barrel 126 forms the oil reservoir 128 for the fan end cap. Openings or ports 129 similar to 89 connect the chamber 127 with the oil reservoir 128. The chamber 127 is counterbored at 131 and has formed therein the annular flange 132. The cap E has formed therewith the annular shouldered portion 133 which is fastened to the shouldered portion 69 by means of the screws or bolts 134. The outer race 136 of a ball bearing cage is in frictional engagement with the counter bore 131 of the cap E as explained for the race 106. The inner race 137 of the second ball bearing cage is tightly secured to the reduced portion 101 of the shaft D and has formed on its outer circumferential surface the annular groove 138 for the ball bearings 140. A lubricant collecting and distributing ring carrier 145 with the circumferential groove 146 on its outer surface is tightly secured to the reduced portion 103 of the shaft D within the barrel 125. A lubricant collecting and distributing ring 148 bears on carrier 145 in its groove 146 and extends from the chamber 127 to the oil reservoir 128 through the openings or ports 129. An oil and vent cup 150 of the usual construction is supported on the barrel E and feeds oil or other lubricant to the chamber 127.

A rotor F is located within the casing A and comprises the disc 151 and the spokes 152 which extend from the hub 153. The spokes 152 terminate at their outer ends in the ring 154 and buckets 155 with the dovetailed lugs 156 are connected to the outer circumferential portion of the disc 151 and to the ring 154.

The hub 153 at one end bears against the collar 104 and is fastened to the shaft D by means of the key 157. A pair of jamb nuts 160 and 161 are in threaded engagement with an enlarged portion of the shaft D and lock the rotor F in place.

A removable stuffing box barrel 165 for the stuffing box G is in threaded engagement with the sleeve 33 and a stuffing box gland 166 is in threaded engagement with the barrel 165. Metallic anti-friction packing 167 is located in the barrel 165 and is held in place by means of the gland 166 around the shaft D. The packing 167 is essentially of fibrous Babbitt metal, saturated in engine oil, rolled in graphite and pressed into shape.

A removable stuffing box barrel 170 for the stuffing box H is an exact duplicate of the barrel 165 and is in threaded engagement with the sleeve 75. A stuffing box gland 172 is a duplicate of 166 and is in threaded engagement with the barrel 170. Packing 173 a duplicate of 167 is located in the barrel 170.

In the threaded portion 80 of the support 77 is supported the stuffing box barrel 175 for the stuffing box I and is a duplicate of the barrel 170. A stuffing box gland 176 which is a duplicate of the gland 172 is in threaded engagement with the barrel 175. Packing 177 is located in the barrel 175 and consists of asbestos, copper wire soaked in oil and graphite, and is pressed into proper shape.

In the stuffing box support 63 is supported a stuffing box barrel 180, which is a duplicate of 175 and has in threaded engagement a stuffing box gland 181 which is a duplicate of 176 for the stuffing box K. Packing 182 is supported in the barrel 180 and is a duplicate of the packing 177.

The rear or outer end of the fan end cap E is threaded at 185 and a stuffing box gland 186 is supported in the threads 185.

Packing 187 similar to the packing 182 is held in place by the gland 186.

On the reduced portion 103 of the shaft D there is fastened the fan wheel L. The hub 190 of the fan wheel bears at one end against one end of the collecting ring carrier 145 and a nut 191 is in threaded engagement with the outer end of the shaft D and bears against said hub. A key 192 also locks the hub 190 to the shaft D. It will be noted that the turbine end cap B is closed at its outer end and that the fan end cap E has extending through its outer end the shaft D.

A fan casing is indicated at M and comprises the barrel 195 with the flange end 196 having formed therewith the threaded lugs 197. Spacing bolts 198 at one end are in threaded engagement with the lugs 197 and at the other end are in threaded engagement with the lugs 32.

To operate the turbine the driving fluid or steam is admitted from the pipe 37 into the manifold chamber 35. Next either or both of the valves 46 and 56 are located in their open positions to cause the driving fluid to impinge against the buckets 155 to turn the rotor F. The driving fluid is discharged through the exhaust pipe 26. By this means the turbine shaft D is caused to turn and with it the fan wheel L will rotate.

With the rotations of the shaft D the lubricant collecting and distributing ring 120 creeps on the carrier 115 in the circumferential groove 116. Oil is located in the oiler reservoir 88, and the ring 120 extending beneath the surface thereof and lifts it in a fine film.

This film remains intact and when the maximum speed of the turbine shaft D is reached, a continuous fine stream of oil is carried to the carrier 115 where it collects. From the carrier 115 the oil is distributed by centrifugal force into the journal chamber 87, in the space between the flange 117 and the ball bearings 110. The oil will collect in the lower portion of the barrel 85 to the level of the lower edges of the ports 89 as indicated at N in Fig. 6 and thoroughly lubricate the ball bearings 110. The overflow of oil will pass through the port 79 back to the reservoir 88. It will be noted that the lower edges of the ports 89 are slightly below the axial center line of the shaft D. In this manner the lubricant or oil makes a complete circulation from the oil reservoir 88, around and about the ball bearings 110 and back to said reservoir. With this means and method of lubrication, the lubricant is prevented from being beaten up into foam, and from being raised in temperature, as results when a chain oiler is used. The lubricant collecting and distributing ring 148 operates with its coacting elements to lubricate in a similar manner the ball bearings 140. The turbine fan end cap B with its appurtenances and the fan end cap E, provide two separate oiling systems for the opposite ends of the turbine shaft D. Thereby the lubrication of the said shaft can be successfully accomplished in case the turbine is out of plumb.

The invention shown and described may be modified in various ways, and the applicant claims all modifications within the spirit of the invention and claims.

Having described my invention what I desire to secure by Letters Patent and claim is:

1. The combination of a casing, a shaft extending through the casing, a rotor in the casing and fastened to said shaft, arms extending from the casing, a detachable cap supported by said arms having contained therein a journal chamber and an oil reservoir, ports connecting said chamber and reservoir, and a lubricant collecting and distributing ring extending from the journal chamber, through said ports into and through a lubricant in the oil reservoir, said ring carrying the lubricant from said reservoir to said chamber and lubricating said shaft during the rotation of the latter.

2. The combination of a casing, a shaft extending through the casing, a rotor in the casing and fastened to said shaft, a detachable cap for the casing, said cap having therein a journal chamber and an oil reservoir, ports connecting said chamber and reservoir, roller bearings in said chamber for said shaft and a lubricant collecting and distributing ring extending from the journal chamber, through said ports into and through a lubricant in the oil reservoir, said ring carrying the lubricant from said reservoir to said chamber and lubricating said ball bearings during the rotations of the shaft.

3. The combination of a casing, a shaft extending through the casing, a rotor in the casing and fastened to said shaft, a detachable cap for the casing, said cap having therein a journal chamber and an oil reservoir, ports connecting the chamber and reservoir, an outer race for a ball bearing in frictional engagement with a counterbore in said cap, an inner race fastened to said shaft, ball gearings supported in the races and a lubricant collecting and distributing ring extending from the journal chamber through said ports into a lubricant in the oil reservoir, the said outer race moving a predetermined amount with the rotations of the shaft and the said ring simultaneously carrying a lubricant from said oil reservoir and distributing it on said ball bearings.

4. The combination of a casing, a bonnet for the casing, a shaft extending through the casing and bonnet, a cap for the shaft containing a journal chamber and an oil reservoir, ports between the chamber and reservoir and a lubricant collecting and distributing ring extending from said chamber through said ports, to said reservoir.

5. The combination of a casing, a bonnet for the casing, arms extending from the bonnet, a support at the outer ends of the arms, a cap detachably connected to the support, said cap having therein a journal chamber and an oil reservoir, ports connecting the chamber and reservoir, a shaft extending through the casing and bonnet and into said cap, a lubricant collecting and distributing ring extending from the journal chamber into a lubricant in the oil reservoir and carrying the lubricant from the reservoir into said chamber and on said shaft during the rotations of the latter and a rotor in said casing fastened to said shaft.

Signed at Chambersburg in the county of Franklin and State of Pennsylvania this 5th day of June A. D. 1919.

CHARLES T. COE.